UNITED STATES PATENT OFFICE.

PAUL JULIUS, OF LUDWIGSHAFEN, GERMANY, ASSIGNOR TO BADISCHE ANILIN & SODA FABRIK, OF LUDWIGSHAFEN, GERMANY, A CORPORATION OF BADEN.

BROWN-RED AZO DYE.

SPECIFICATION forming part of Letters Patent No. 688,647, dated December 10, 1901.

Application filed September 20, 1901. Serial No. 75,794. (No specimens.)

*To all whom it may concern:*

Be it known that I, PAUL JULIUS, doctor of philosophy and chemist, a subject of the Emperor of Austria-Hungary, residing at Ludwigshafen-on-the-Rhine, in the Kingdom of Bavaria, Germany, have invented new and useful Improvements in Azo Coloring-Matters, of which the following is a specification.

In the specification of the application for French Patent No. 301,530, dated June 22, 1900, there is described the production of 4-chlor-2-amido-1-phenol-6-sulfo-acid and the corresponding diazo compound therefrom. It is there stated that the said diazo compound produces with amins, phenols, amido-phenols, and their sulfonic acids azo coloring-matters, and no limitation or restriction as regards the amins, phenols, and amido-phenols suitable for this purpose is mentioned. Only one azo coloring-matter is, however, described and claimed—namely, that derived from the aforementioned diazo compound and 2.8.6 amido-naphthol sulfonic acid.

I have discovered that the statement above mentioned of the French specification is not correct in its general form. The diazo compound of 4-chlor-2-amido-1-phenol-6-sulfo-acid possesses but small affinity for azo-dye components, so that even when under the most favorable conditions to obtain combination, such as using highly-concentrated solutions and working at as high a temperature as possible, in many cases either no combination takes place or the amount of azo dye formed is so slight that no practical manufacture can be based upon the process. I have also discovered that apart from the aforesaid dye from 2.8.6 amido-naphthol sulfo-acid useful results can be obtained from this diazotized chlor-amido-phenol sulfo-acid only when using particular components and that it is necessary when combining the diazo compound with these to work at a higher temperature than is usually the case. A component which I have found suitable for this purpose is beta-naphthol. The new azo coloring-matter obtained by means of this component dyes wool brown-red, which after subsequent treatment with a bichromate (or its equivalent) on the fiber becomes blue-black, while on treatment with copper sulfate it becomes carmine-red. It dissolves in hot water, yielding a violet-blue solution, which on the addition of caustic soda becomes red. In concentrated sulfuric acid (containing about ninety-six per cent. of $H_2SO_4$) it dissolves, the solution being fuchsin-red and yielding a brown precipitate on the addition of water.

The following example will serve to further illustrate the nature of this invention and the manner in which the same may be carried into practical effect; but the invention is not confined to the details therein given. The parts are by weight.

Example: Dissolve one hundred and twelve (112) parts of 4-chlor-2-amido-1-phenol-6-sulfo-acid in one thousand seven hundred (1,700) parts of water by adding just the sufficient quantity of caustic soda thereto. To this solution add thirty-five (35) parts of sodium nitrite which has previously been dissolved in a small amount of water, and then run in the necessary quantity of hydrochloric acid. At first a partial precipitation of the amido acid takes place; but in a short time it is converted into the diazo compound and goes into solution. Pour the clear yellow-colored diazo solution thus obtained into a solution of seventy-five (75) parts of beta-naphthol and sixty (60) parts of caustic-soda lye (containing about thirty-five per cent. of NaOH) in water to which an excess of carbonate of soda has been added. Heat (while stirring) to a temperature of from forty (40°) to forty-five (45°) degrees centigrade. The formation of the coloring-matter is as a rule at an end in from one (1) to two (2) hours. It is then drained on the filter-pump, pressed, and dried.

Now what I claim is—

The azo coloring-matter such as can be obtained by combining diazotized chlor-amido-phenol-sulfo-acid with beta-naphthol, which dyes wool brown-red shades; these shades becoming blue-black on treatment with bichromate of potash and carmine-red on treatment with copper sulfate, whose aqueous solution is violet-blue, the solution on the addition of caustic soda becoming red, which dissolves in concentrated sulfuric acid, the solution being fuchsin-red and giving a brown precipitate on the addition of water, substantially as described.

In testimony whereof I have hereunto set my hand in the presence of two subscribing witnesses.

PAUL JULIUS.

Witnesses:
ERNEST F. EHRHARDT,
JACOB ADRIAN.